US008100258B2

(12) United States Patent
Meyers

(10) Patent No.: US 8,100,258 B2
(45) Date of Patent: Jan. 24, 2012

(54) FISHING TACKLE ORGANIZER AND CARRIER

(76) Inventor: James Gerald Meyers, Dauphin, PA (US)

( * ) Notice: Subject to any disclaimer, the term of this patent is extended or adjusted under 35 U.S.C. 154(b) by 19 days.

(21) Appl. No.: 12/661,195

(22) Filed: Mar. 12, 2010

(65) Prior Publication Data

US 2010/0243491 A1    Sep. 30, 2010

Related U.S. Application Data

(60) Provisional application No. 61/210,188, filed on Mar. 16, 2009.

(51) Int. Cl.
*B65D 85/00* (2006.01)

(52) U.S. Cl. ............... 206/315.11; 206/372; 211/126.2; 312/126

(58) Field of Classification Search ............ 206/315.11, 206/372, 373, 478, 479, 481, 805, 579, 575; 312/901, 902, 126; 211/126.2; 220/524
See application file for complete search history.

(56) References Cited

U.S. PATENT DOCUMENTS

| | | | | | |
|---|---|---|---|---|---|
| 2,542,640 | A | * | 2/1951 | Dixon | 206/478 |
| 2,623,760 | A | * | 12/1952 | Fornelius | 410/51 |
| 2,907,507 | A | * | 10/1959 | Solak | 294/148 |
| 3,346,313 | A | * | 10/1967 | Fee | 312/234.1 |
| 4,129,346 | A | * | 12/1978 | Hofman | 312/324 |
| 4,494,804 | A | * | 1/1985 | O'Keeffe | 312/211 |
| 4,504,000 | A | * | 3/1985 | Doyel | 223/107 |
| 4,846,346 | A | * | 7/1989 | Kime | 206/372 |
| 4,958,730 | A | * | 9/1990 | Bunten | 206/315.11 |
| 4,989,734 | A | * | 2/1991 | Mode et al. | 206/575 |
| 5,465,987 | A | * | 11/1995 | DellaVecchia | 280/47.28 |
| 5,740,924 | A | * | 4/1998 | Hunt | 211/40 |
| 5,755,338 | A | * | 5/1998 | vom Braucke et al. | 211/13.1 |
| 5,845,780 | A | * | 12/1998 | Allen | 206/579 |
| 6,123,344 | A | * | 9/2000 | Clegg | 280/47.19 |
| 6,138,827 | A | * | 10/2000 | Marshall | 206/373 |
| 6,375,289 | B1 | * | 4/2002 | Yemini | 312/290 |
| 6,886,693 | B1 | * | 5/2005 | Davenport et al. | 206/494 |
| 6,913,151 | B2 | * | 7/2005 | Stevenson | 209/630 |
| 7,464,945 | B2 | * | 12/2008 | Humphries et al. | 280/47.26 |
| 7,735,646 | B2 | * | 6/2010 | Scaletta et al. | 206/373 |
| 2002/0125159 | A1 | * | 9/2002 | Hann | 206/372 |
| 2004/0074791 | A1 | * | 4/2004 | Lewter | 206/315.3 |
| 2006/0266663 | A1 | * | 11/2006 | Rhea | 206/223 |
| 2009/0261008 | A1 | * | 10/2009 | Dillon et al. | 206/434 |

FOREIGN PATENT DOCUMENTS

| | | | | |
|---|---|---|---|---|
| GB | 2226807 | A | * | 7/1990 |
| JP | 03162257 | A | * | 7/1991 |

* cited by examiner

*Primary Examiner* — David Fidei
(74) *Attorney, Agent, or Firm* — Stone, Duncan & Linsenbach, PC; Neal Abrams

(57) ABSTRACT

This invention provides a portable or fixed device for organizing and transporting items utilized by fisherman, hobbyists, tradesmen and the like. It comprises a main compartment containing a plurality of trays in which the items are organized and stored, and side and top compartments for organizing and storing items that are less suitable for storage in trays, such as elongated items and tools. The trays are held in the main compartment by a plurality of removable elastic cords which span the open front of the main compartment at such heights as to engage each tray at a point along its height. Trays can be removed by displacing the cords. Elastic cords also are provided to hold items in the side compartments. A cutting or work board can be is mounted on the back of the device, and slip-resistant surfaces can be installed on the top and the bottom. Handles can be provided for carrying the device, or the device can be built into the structure of a boat, a vehicle, or a fixed structure.

18 Claims, 4 Drawing Sheets

FISHING TACKLE ORGANIZER AND CARRIER

RELATED PATENT APPLICATION

Support for the disclosure in this application is found in the applicant's provisional patent application No. 61/210,188, filed Mar. 16, 2009.

BACKGROUND OF THE INVENTION

This invention relates an apparatus for storing items typically used by fisherman, hobbyists, and tradesmen such as electricians, mechanics and others, in a plurality of compartments and removable trays. Such persons always have had the problem of organizing and carrying the assortment of items which are essential to pursuing their hobbies and conducting their business. In the past, there have been many tackle boxes, tool boxes and the like that have provided means for organizing and carrying these items. However, none have afforded the versatility of use and the ready access to these items that is provided by the present invention.

While this invention is described in large part in the context of use for fishing tackle, it is not so limited, but also lends itself well to use in other fields. It should also be noted that the features and basic structure of the invention can be packaged in a box-like structure so as to allow portability, or they can be incorporated into the construction of boats, vehicles, and permanent structures.

THE PRIOR ART

The prior art is replete with a multitude of tackle boxes, tool boxes and the like for organizing and carrying the gear that fisherman, hobbyists and tradesman utilize. A typical arrangement is a box containing a plurality of drawers which, while they can be pulled out to gain access to their contents, cannot easily to removed from the box and therefore the entire box must be carried from place to place. The drawers are maintained in the box by latches or by folding panels, which are cumbersome to use. Individual compartmented trays also are used, but these are cumbersome to transport.

SUMMARY OF THE INVENTION

The present invention relates to a multi-purpose organizer that provides ready access to such items as fishing tackle, tools, and those carried by tradesmen, and does so in a manner which provides fisherman and other hobbyists with a satisfactory experience, and tradesman with efficient operation. The invention is manifested in a first embodiment, which is portable, and a second embodiment in which the features are permanently installed in a boat, a vehicle, or a permanent structure. A first embodiment comprises a main compartment containing a plurality of trays in which small items can be stored in an organized fashion, and side and top auxiliary compartments for organizing and storing items that are less suitable for storage in trays, such as elongated items and tools. Both embodiments are centered about a main compartment which contains one or more trays in which the items to be organized are placed. Depending upon the manner of installation, both the portable and the fixed embodiments also can provide auxiliary compartments and other accessories, such as a cutting board or work board having marks for measuring the length of items placed thereon, and a tool caddy for quick access to much-used items. Particularly in the portable embodiment, a slip-resistant surface can be installed on the top of the main compartment, which can be utilized as a seat and as a non-slip support for the board. A slip-resistant surface also can be provided on the bottom in the portable embodiment to inhibit slippage of the box when placed on a wet or canted surface. Handles can be provided for carrying the portable device.

The invention provides a main compartment that is open in the front, and in which one or more storage trays are stacked, one upon the other. A plurality of cords having elastic properties span the front opening from side to side, so located as to hold each of the trays individually in place within the open front of the compartment. Access to any of the stacked trays can easily and conveniently be made by displacing the restraining elastic cord out of the way and pulling the tray from its position in the stack, or by tilting the tray upwardly so that it can be pulled between two adjacent elastic cords. The remaining trays then simply drop toward the bottom of the compartment. The tray that has been removed can be returned to the compartment by placing it on the top of the stack of trays, or it can be replaced in its former position in the stack by sliding it between the cords and the other trays. Thus, the contents in any of the trays may quickly and easily be removed and returned to the compartment. Especially in the portable embodiment of the invention, side compartments can be added, attached to the sides of the box like hinged doors. The side compartments have open fronts and pivot between a closed position in contact with the outside of the box and an open position wherein their contents can be accessed. A top compartment can be added with a hinged lid that opens upwardly. A ready access tool caddy can be provided on the outside of at least one of the side compartments to place items such as pliers, cutters, knives and other tools within easy reach. A slotted frame on the rear of the main compartment holds the removable cutting board.

BRIEF DESCRIPTION OF THE DRAWINGS

For a more complete understanding of the invention, and to illustrate the objects and advantages of the invention, reference is made to the following description taken in conjunction with the accompanying drawings, in which.

DESCRIPTION OF THE PREFERRED EMBODIMENTS OF THE INVENTION

Figure 1:
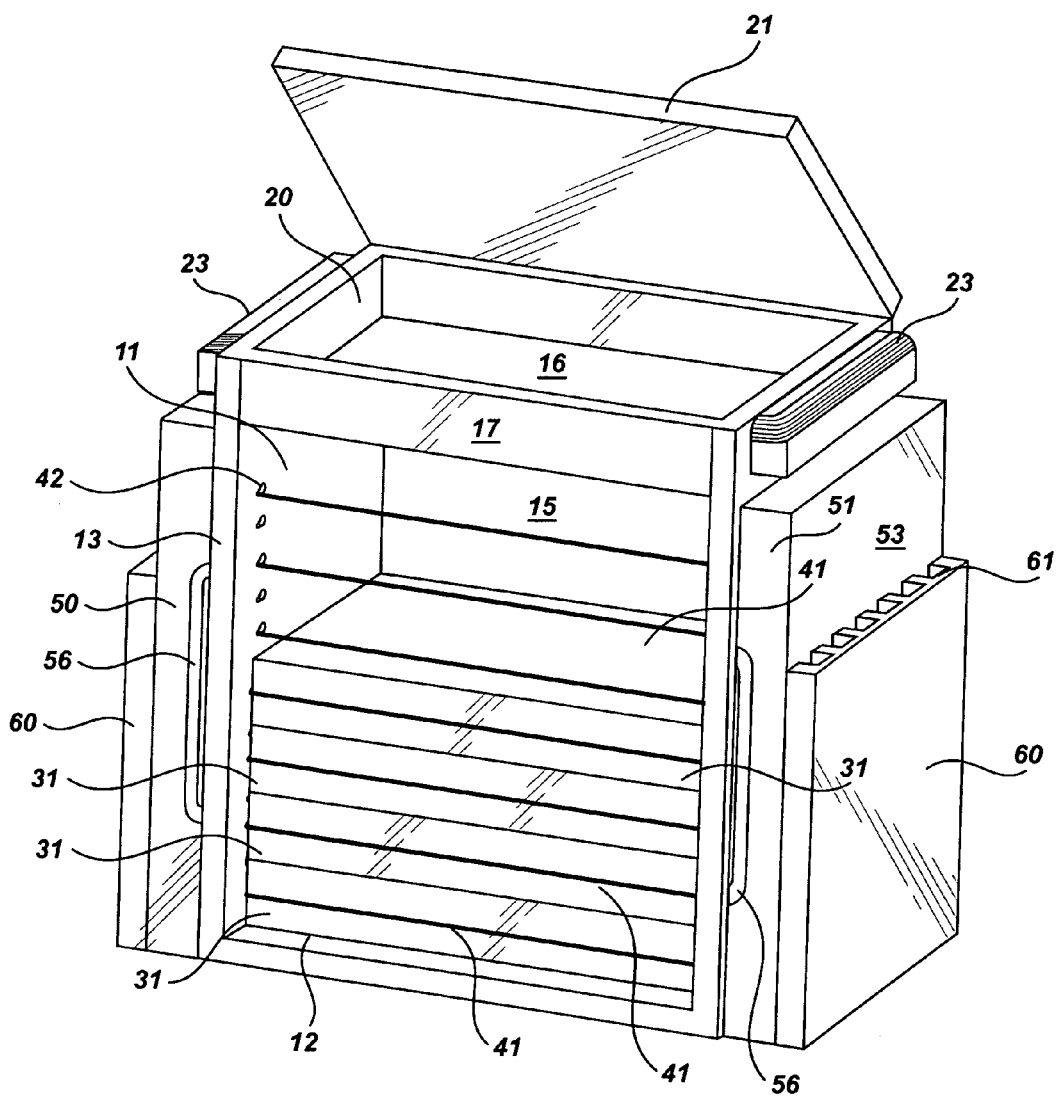
FIG. 1 is a front perspective view of the portable embodiment of the invention with all of the compartments closed.
Figure 4:
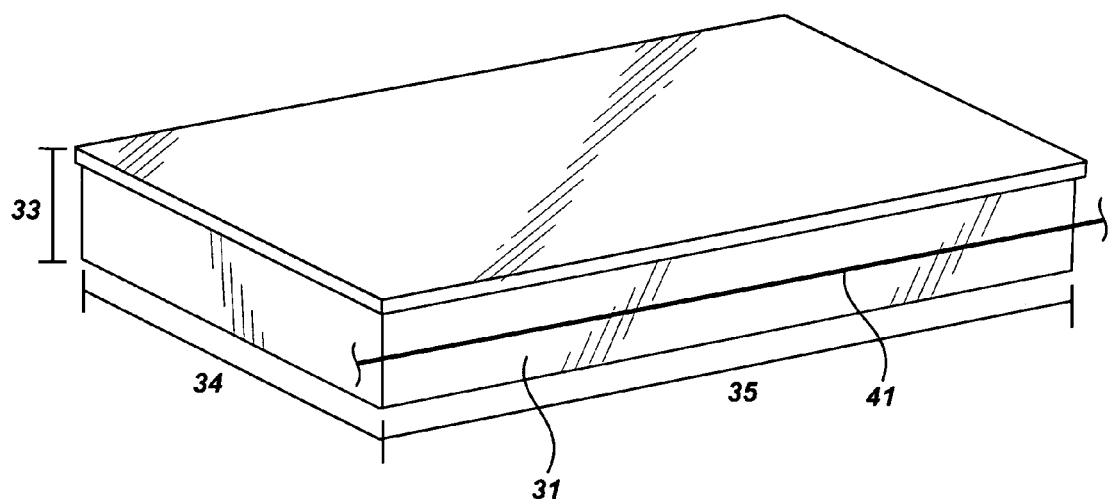
FIG. 4 is a front perspective diagrammatic view of a tray that is usable in the invention.

FIG. 1 is a perspective view of a first embodiment of the invention, which not only provides a means for organizing supplies but allows the supplies to be carried from place to place. In this embodiment there is a main compartment 11 defined by a bottom panel 12, first and second side panels 13 and 14, a back panel 15 and a top panel 16. Main compartment 11 has a width, a height and a depth, and is open in the front. An upper panel 17 and the upper portions of side panels 13 and 14 and rear panel 15 define a top compartment 20. A lid 21 mounted at the rear on hinge means (not shown), pivots to open and close top compartment 20. The outer surface of lid 21 can be covered in a non-slip material. Lifting handles 23 are mounted on side panels 13 and 14 to facilitate lifting and carrying the device. A plurality of trays 31 are placed within main compartment 11, stacked directly one upon the other. One of these trays is diagrammatically shown in FIG. 4. Each tray has a width 32, a height 33, and a depth 34. These dimensions are advantageously slightly less than the corresponding dimensions of the interior of main compartment 11. Trays 31 are utilized to store the items typically used by a fisherman, a hobbyist, or tradesman. Trays 31 can be open at the top or have lids, and they typically are divided into compartments and are labeled to denote what items are with each. Examples of these types of trays are marketed under the PLANO trademark.

Installed across the opening in the front of main compartment 11 are a plurality of elastic cords 41, which are attached to side panels 13 and 14. Attachment of cards 41 can be by any appropriate means, which advantageously are such as to allow cords 41 to easily be attached and removed. An example of a appropriate such means is keyhole-shaped openings 42 in side panels 13 and 14, into which are placed knots tied in the ends of cords 41 or other appropriate fasteners mounted on the ends of cords 41. The plurality of elastic cords 41 are generally substantially parallel to bottom panel 12, and the cords are so located and spaced apart as to engage each of stacked trays 31 to prevent them from sliding out of main compartment 11. To accomplish this, one or more cords 41 intercept the trays 31 at a point along their height 33 sufficient to hold them in place in the main compartment, for example, at about one-half of the height 33 of each tray, as is shown inn FIG. 4. Since each of the cords 41 is easily installed and removed, there no need to utilize more elastic cords 41 than there are trays 31 in main compartment 11. The use of multiple attachment points 42 along the entire height of main compartment 11 allows the elastic cords 41 to be positioned so as to intercept trays of various heights. The easily removable cords that can be adjusted for a desired position in the main compartment is an important feature of the invention, which provides flexibility and ease of use that is not present in the prior art devices.

A selected tray 31 can be removed from main compartment 11 in two ways. The user can displace the intercepting cord(s) 41 upwardly or downwardly to clear the selected tray 31 and then pull the tray straight out. Or, the user can grasp the front portion of the selected tray 31, tilt it upwardly, and then pull it out between adjacent elastic cords 41, which will stretch to accommodate this. In either case the remaining trays 31 will tilt in response to these actions, and then merely drop downwardly when the selected tray 31 has been removed. The removed tray 31 can be returned to main compartment 11 by simply placing it on the top of the stack of trays, or returning it to its original location in the stack by displacing some of the cords and slipping it between two adjacent stacked trays. These actions are facilitated by leaving some space above the uppermost tray in the stack to allow room for the trays to tilt upwardly. Trays of varying heights can be used, with the presence of a plurality of cord attachment means allowing quick and easy alignment of the cords with the trays along the entire height of the compartment.

Figure 2:
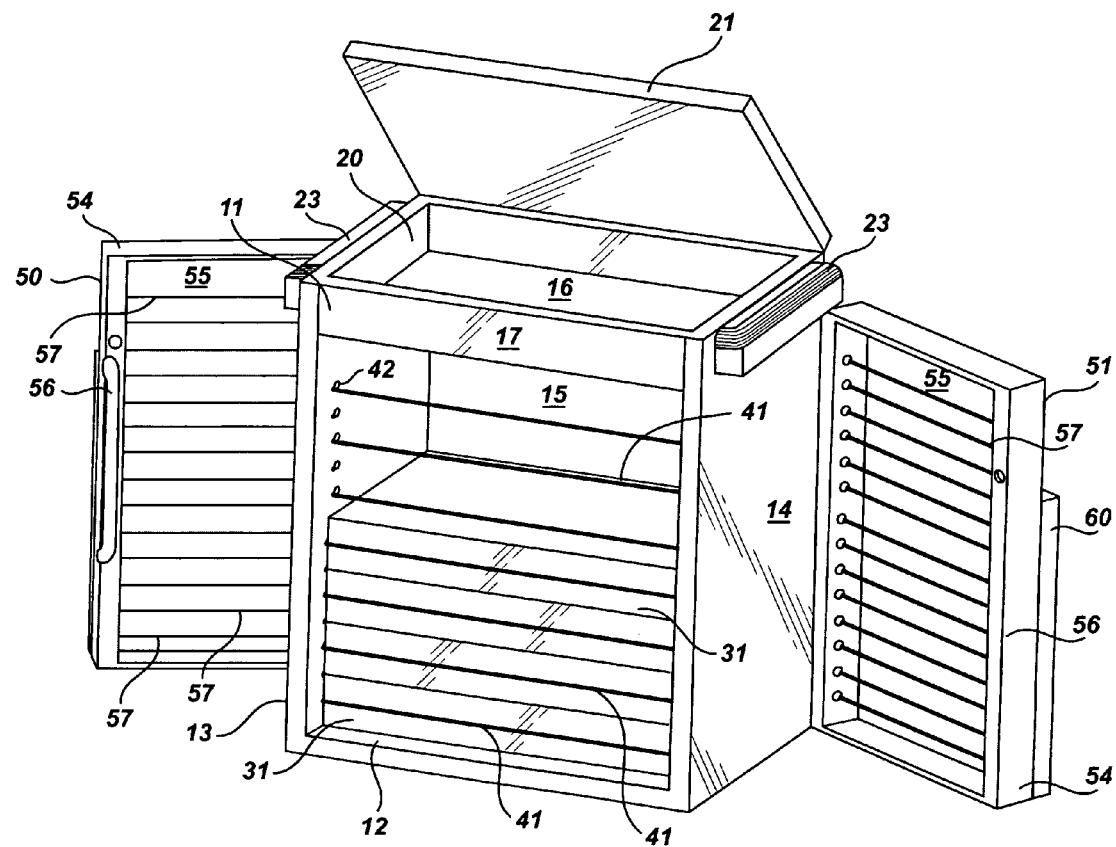
FIG. 2 is a front perspective view of the embodiment of FIG. 1 with all of the compartments open.

Particularly with regard to the portable embodiment of this invention, first and second side compartments 50 and 51 can be attached to the outside surfaces 53 of side panels 13 and 14 by hinge means. Each side compartment 50 and 51 is defined by a rectangular frame 54 and a rear wall panel 55. Side compartments 50 and 51 each are movable between a closed position in contact with the outer surfaces of side panels 13 and 14 (FIG. 1) and an open position (FIG. 2). They are held in the closed position by suitable fastening means such as hook and loop fasteners and can be provided with handles 56. A second plurality of elastic cords 57 is installed between facing portions of each frame 54 along the inside surface of wall panels 55, attached by suitable fastening means or secured in such as keyhole-shaped openings in frame 54. Articles that lend themselves to this type of storage can be secured beneath elastic cords 57, and easily accessed by opening the appropriate side compartment. In the same manner as cords 41, cords 57 can easily be removed, replaced, and relocated. A tool caddy 60, divided into vertical slots 61, can be attached to the outer surface of one or both of side compartments 50 and 51. Items such as knives, screwdrivers and scissors can be placed in slots 61, where they can easily be removed for use and returned.

Figure 3:
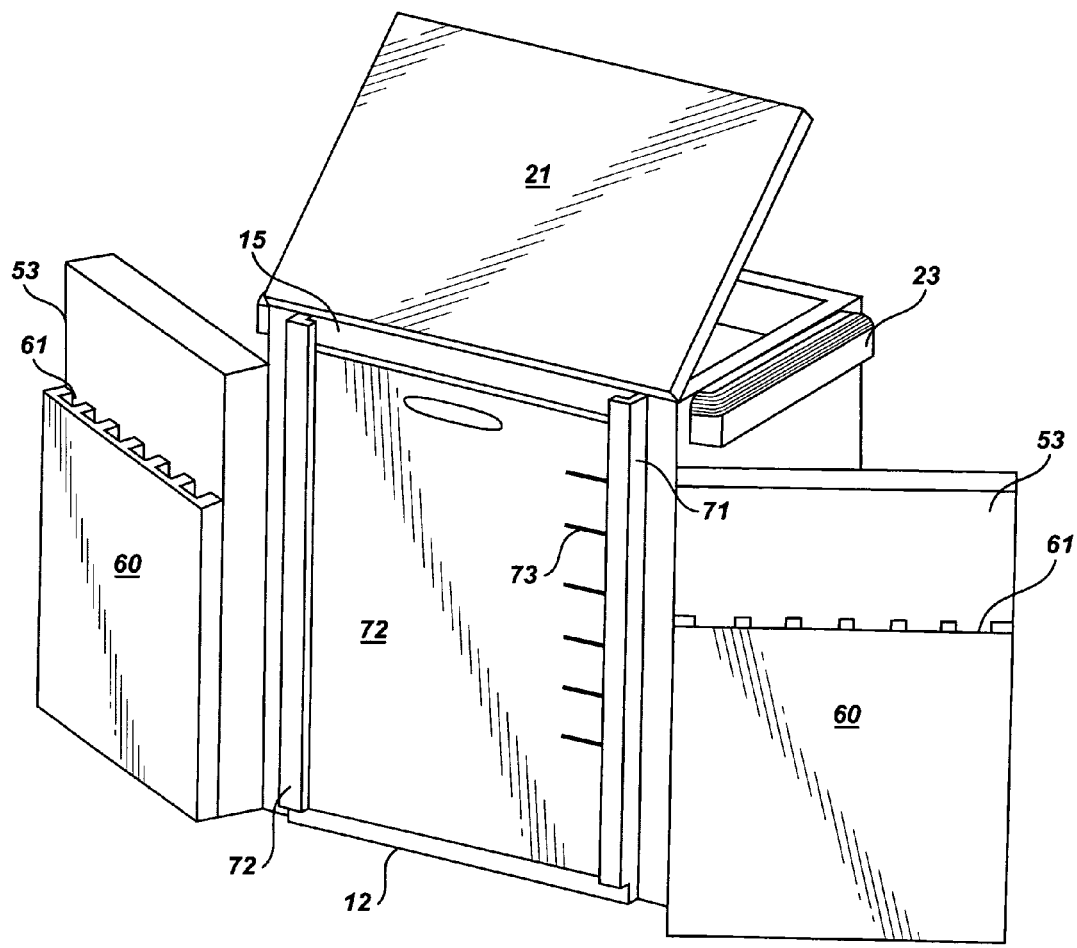
FIG. 3 is a rear perspective view of embodiment of FIG. 1 with all of the compartments open.

As shown in FIG. 3, provided on the outside surface of back panel 15 is a pair of runners 71 which define opposed slots within which a cutting board 72 can be carried, its lower edge resting on base panel 18. Cutting or work board 72 can be provided with measuring indicia 73. Board 72 slides out from runners 71 for use, and can be placed upon the nonslip surface of top 21 for stability during its use. Top 21 also can function as a seat. A second nonslip surface can be installed on the underside of bottom panel 18, to inhibit the organizer and carrier from sliding on the slippery or canted deck of a boat or vehicle, for example. In addition, weights can be placed in the lower portion of the device in order to provide more stability.

The inventive organizer and carrier can be made from any appropriate material, such as wood, plastic, metal, or composite, by the use of known techniques.

The first embodiment of the invention, described above, incorporates the features in a portable carrier. In the second embodiment of the invention some or all of the features described with regard to the portable unit are incorporated into the construction of a boat, a vehicle, or a permanent structure such as a building. For example, the main compartment, with cords and trays, can be built into the structure of a boat beneath a seat, or in the inside of the hull, or in a bulkhead. The side compartments and top compartment also can be incorporated in the same fashion. The same can be said of installing the invention in the body of a vehicle or in structural components of a building, or in units of a wall storage system.

The invention claimed is:

1. An organizer for items utilized by fisherman, hobbyists, and tradesman, comprising:

first and second opposed side panels, a bottom panel, a top panel and a back panel attached together at their contiguous edges to form a compartment, said first side panel having a first interior surface, said second side panel having a second interior surface, said top panel having a top interior surface, said bottom panel having a bottom interior surface, and said back panel having a back interior surface, said interior surfaces delineating a compartment width, a compartment height, and a compartment depth;

said first, second, bottom and top interior surfaces further defining an unobstructed compartment front opening;

a plurality of removable trays each having a tray height and being positioned in a vertical stack within said compartment with one of said plurality of trays resting upon said bottom interior surface and the remaining of said plurality of trays stacked vertically along said compartment height with adjacent of said plurality of trays being in direct contact with one another such that any one of said plurality of trays can individually be inserted into and removed from a position in said stack of trays through said compartment front opening;

a plurality of first cord attachment elements spaced vertically along said compartment height on said first side panel adjacent to said compartment front opening;

a plurality of second cord attachment elements spaced vertically along said compartment height on said second side panel adjacent to said compartment front opening, said plurality of second cord attachment elements being oppositely aligned with said plurality of first cord attachment elements; and a plurality of elastic cords, each of said plurality of elastic cords comprising a first cord end attached to one of said plurality of first cord attachment elements and a second cord end attached to one of said plurality of second cord attachment elements such that each of said plurality of said elastic cords spans said compartment front opening and is oriented substantially parallel to said bottom interior surface, said elastic cords being so located with respect to said chamber height at said compartment front opening as to intersect each said tray at a point along said tray height, whereby each of said trays is prevented from sliding out of said compartment through said front opening by the presence of one of said cords, and whereby each of said trays can individually be inserted into or removed from said compartment and from said stack by vertically displacing the said elastic cord intersecting said tray from its substantially parallel orientation without detachment from said first and said second cord attachment elements.

2. The organizer of claim 1 wherein said first and second cord attachment elements are located respectively on said first and second interior surfaces.

3. The organizer of claim 1 further comprising:
a first exterior surface on said first side panel and a second exterior surface on said second side panel;
a first side compartment having a first side compartment open front and being pivotally attached to said first exterior surface and movable between a closed position wherein said first side compartment open front faces said first exterior surface and an open position wherein said first side compartment open front is spaced from said first exterior surface; and
a first fastener for selectively securing said first side compartment in said closed position.

4. The organizer of claim 3 wherein said first side compartment further comprises a first side compartment back panel and a plurality of first side compartment elastic cords extending substantially across said first side compartment back panel, whereby items can be placed inside said first side compartment and secured therein by said first side compartment elastic cords.

5. The organizer of claim 3 further comprising:
a second side compartment having a second side compartment open front and being pivotally attached to said second exterior surface and movable between a closed position wherein said second side compartment open front faces said second exterior surface and an open position wherein said second side compartment open front is spaced from said second exterior surface; and
a second fastener for selectively securing said second side compartment in said closed position.

6. The organizer of claim 3 wherein said first side compartment further comprises a first outer side compartment surface and a tool rack mounted on said first outer side compartment surface.

7. The organizer of claim 1 further comprising:
a top exterior surface on said top panel;
a top compartment positioned on said top exterior surface and having an open top;
a lid attached to said top compartment and being movable between a closed position closing said open top and an open position spaced from said open top; and
a lid fastener for selectively securing said lid in said closed position.

8. The organizer of claim 1 wherein each of said plurality of first and second cord attachment elements comprises a keyhole-shaped opening.

9. The organizer of claim 1 further comprising a back panel exterior surface, a pair of vertically oriented opposed grooved runners attached to said back panel exterior surface, and a cutting board removably mounted in said runners.

10. An organizer for items packaged in removable trays and utilized by fisherman, hobbyists, and tradesman, said organizer comprising:
first and second opposed side panels, a bottom panel, a top panel and a back panel attached together at their contiguous edges to form a compartment, said first side panel having a first interior surface, said second side panel having a second interior surface, said top panel having a top interior surface, and said bottom panel having a bottom interior surface, said interior surfaces delineating a compartment width, a compartment height, and a compartment depth;
said first, second, bottom and top interior surfaces further defining an unobstructed compartment front opening whereby a plurality of removable trays can be placed in a vertical stack within said compartment positioned one upon the other with adjacent trays being in direct contact with one another and with each tray being individually insertable into and removable from a position in the stack of trays through said compartment front opening;
a first plurality of cord attachment elements spaced vertically along said first side panel adjacent to said compartment front opening;
a second plurality of cord attachment elements spaced vertically along said second side panel adjacent to said compartment front opening, said second plurality of cord attachment elements being oppositely aligned with said first plurality of cord attachment elements; and
a plurality of elastic cords each comprising a first cord end attached to one of said first plurality of cord attachment elements and a second cord end attached to one of said second plurality of cord attachment elements such that each of said plurality of said elastic cords spans said compartment front opening and is oriented substantially parallel to said bottom interior surface, said plurality of elastic cords being selectively positionable along said compartment height to intercept trays along the tray height to retain the trays in said compartment and to allow an individual tray to be inserted into or removed from said compartment and the stack of trays by vertically displacing the said elastic cord intersecting the tray from its substantially parallel orientation without detachment from said first and said second cord attachment elements.

11. The organizer of claim 10 wherein said first and second cord attachment elements are located respectively on said first and second interior surfaces.

12. The organizer of claim 10 further comprising:
a first exterior surface on said first side panel and a second exterior surface on said second side panel;
a first side compartment having a first side compartment open front and being pivotally attached to said first exterior surface and movable between a closed position wherein said first side compartment open front faces said first exterior surface and an open position wherein said first side compartment open front is spaced from said first exterior surface; and a first fastener for selectively securing said first side compartment in said closed position.

13. The organizer of claim 12 wherein said first side compartment further comprises a first side compartment back panel and a plurality of first side compartment elastic cords extending substantially across said first side compartment back panel, whereby items can be placed inside said first side compartment and secured therein by said first side compartment elastic cords.

14. The organizer of claim 12 further comprising:

a second side compartment having a second side compartment open front and being pivotally attached to said second exterior surface and movable between a closed position wherein said second side compartment open front faces said second exterior surface and an open position wherein said second side compartment open front is spaced from said second exterior surface; and a second fastener for selectively securing said second side compartment in said closed position.

15. The organizer of claim 13 wherein said first side compartment further comprises a first outer side compartment surface and a tool rack mounted on said first outer side compartment surface.

16. The organizer of claim 10 further comprising:

a top exterior surface on said main top panel;

a top compartment positioned on said top exterior surface and having an open top;

a lid pivotally attached to said top compartment and being movable between a closed position closing said open top and an open position spaced from said open top; and a lid fastener for selectively securing said lid in said closed position.

17. The organizer of claim 10 wherein each of said plurality of first and second cord attachment elements comprises a keyhole shaped opening.

18. The organizer of claim 10 further comprising a back panel exterior surface, a pair of vertically oriented opposed grooved runners attached to said back panel exterior surface, and a cutting board removably mounted in said runners.

* * * * *